United States Patent [19]

Englander

[11] Patent Number: 5,169,044

[45] Date of Patent: Dec. 8, 1992

[54] HOLDER DEVICE

[75] Inventor: Curt Englander, Tranbärsstigen, Sweden

[73] Assignee: Industri AB Thule, Hillerstorp, Sweden

[21] Appl. No.: 768,575

[22] PCT Filed: Feb. 8, 1990

[86] PCT No.: PCT/SE90/00082

§ 371 Date: Sep. 20, 1991

§ 102(e) Date: Sep. 20, 1991

[87] PCT Pub. No.: WO90/11206

PCT Pub. Date: Oct. 4, 1990

[30] Foreign Application Priority Data

Mar. 22, 1989 [SE] Sweden .............................. 8901021

[51] Int. Cl.[5] .............................................. B60R 9/08
[52] U.S. Cl. ...................................... 224/324; 211/20; 224/315; 224/331
[58] Field of Search ............... 224/324, 42.08, 309, 224/310, 315, 330, 331, 30 R; 211/20, 21; 403/384, 386; 248/225.31, 227, 228, 229, 231.5; 269/110, 152, 203, 207

[56] References Cited

U.S. PATENT DOCUMENTS

| | | | |
|---|---|---|---|
| 1,346,170 | 7/1920 | Brandt et al. ................ | 403/384 |
| 4,442,961 | 4/1984 | Bott ............................. | 224/324 X |
| 4,452,384 | 6/1984 | Graber ......................... | 224/309 X |
| 4,606,216 | 8/1986 | Riutta .......................... | 248/229 X |
| 4,629,104 | 12/1986 | Jacquet ....................... | 224/324 |
| 4,643,388 | 2/1987 | Tazawa ....................... | 403/386 X |
| 4,702,401 | 10/1987 | Graber et al. ................ | 224/324 X |
| 4,961,524 | 10/1990 | Huntz ......................... | 224/324 |
| 5,042,705 | 8/1991 | Johansson ................... | 224/324 X |
| 5,052,605 | 10/1991 | Johnsson .................... | 224/324 |

Primary Examiner—Henry J. Recla
Assistant Examiner—Glenn T. Barrett
Attorney, Agent, or Firm—Burns, Doane, Swecker & Mathis

[57] ABSTRACT

A holder device for fixedly securing a load (4, 5), for example a bicycle, on a vehicle roof is provided with a support channel (1) in which the wheel (4) of the cycle rests. The holder device is further provided with a retaining stirrup (6, 7) pivotal to an operative position for engagement with the frame tube (5) of the cycle. The retaining stirrup is connected by the intermediary of joints (8) to the support channel (1), which is, in its turn, secured with a releasable, U-shaped yoke (10) in the region of the connection between the retaining stirrup (6, 7) and the support channel (1), on a strut (3) disposed transversely across the vehicle roof. In order to prevent unauthorized removal of the holder device, with a cycle secured therein, from the strut (3), the stirrup (6, 7) is, according to the invention, provided, at the joints (8), with detent portions (12) which, in the operative position of the retaining stirrup (6, 7), cover an aperture (11) through which a locking heel on one shank of the yoke (10) must be passed on removal of the yoke (10). By pivoting the retaining stirrup (6,7), when the cycle is removed, to an inoperative position, the aperture (11) is exposed so that the yoke (10) may be removed. The other end of the yoke (10) is provided with an excenter lock.

4 Claims, 3 Drawing Sheets

HOLDER DEVICE

TECHNICAL FIELD

The present invention relates to a holder device for securing a load on a vehicle roof, comprising a support portion for supporting the load, a movable anchorage portion which is displaceable to an operative position and which, in the operative position, is disposed to engage with and positionally fix the load on the support portion, the anchorage portion being connected to the support portion and the holder device proper being fixable on a load carrier strut extending transversely across the vehicle roof, by means of a releasable locking member which is disposed in the region of the connection of the anchorage portion to the support portion.

BACKGROUND ART

Holder devices of the type mentioned by way of introduction are previously known in this Art and may, for example, be intended for the transport of bicycles on a vehicle roof.

Such prior art holder devices have, for instance, been secured to a roof rack or the like extending across the vehicle roof, by means of U-shaped threaded stirrups which are positioned about the rack and are screwed in place in the holder device. In such instance, use may be made of conventional nuts, in which even the holder device runs the risk of being stolen, together with the load carried thereon. Alternatively however, use may also be made of hand nuts which are lockable by means of a cylinder lock. Since the roof rack frame is also lockable on the vehicle by means of a cylinder lock and, as a rule, also the load itself in the holder device by means of a further cylinder lock, it will be readily appreciated that there is a considerable risk of confusing the various keys involved. Furthermore, the risk of losing these keys cannot be discounted.

PROBLEM STRUCTURE

Thus, the present invention has for its object to realise a holder device of the type mentioned by way of introduction, the holder device being designed in such a way that it may be mounted in a tamper-proof manner on the load carrier strut extending across the vehicle roof without the assistance of any form of cylinder lock. The present invention further has for its object to design the holder device in such a way that it will be simple and economical in manufacture an easy to mount on and dismount from the roof rack. The present invention further has for its object to realise a holder device of such type as has no loose parts susceptible to being lost.

SOLUTION

The objects forming the basis of the present invention are attained if the holder device disclosed by way of introduction is characterised in that the anchorage portion is provided, in the region of its connection with the support portion, with a detent portion which, in the operative position of the anchorage portion, is located in a detent position and, in an inoperative position of the anchorage portion, is located outside the detent position; and that the locking member is provided with a locking portion which by co-operation with the detent portion in the detent position thereof, prevents release of the locking member.

In one embodiment of the present invention, the holder device is intended as a holder device specifically designed for the transport of bicycles. According to the present invention, this holder device is also suitably characterised in that the anchorage portion is, by means of joints, pivotally secured in a mid-section which is connected to the support portion and displays upwardly angled portions with the joints; that the upwardly angled portions are provided with an aperture for insertion and removal of the locking portion of the anchorage portion, the detent portion on the anchorage portion being movable, by pivoting thereof, to a position where the aperture is closed.

The above-considered embodiment of the present invention is suitably also characterised in that the locking member is in the form of a U-shaped stirrup; that the locking portion consists of a head at the free end of its one shank; and that its other shank is provided with a locking clamp for fixedly tightening the stirrup about the carrier strut.

Further advantages will be attained according to the present invention if the holder device is also given one or more of the characterising features as set forth in claims 4 and 5.

BRIEF DESCRIPTION OF THE ACCOMPANYING DRAWINGS

The nature of the present invention and its aspects will be more readily understood from the following brief description of the accompanying Drawings, and discussion relating thereto.

DESCRIPTION OF PREFERRED EMBODIMENT

While the present invention will be described hereinbelow as a holder device specifically designed for the transport of bicycles, the same inventive concept may, of course, be applied to other types of holders, for example holders for the transport of skis, windsurfing boards or other types of loads. In such instance, the decisive factor is only that these different types of holders have a movably disposed portion which is analogous with the anchorage portion which will be described in greater detail below and which has one operative and one inoperative position. According to the most general inventive concept, switching of such an anchorage portion or a portion analogous therewith is employed to realise blocking of those retainer elements by means of which the holder device is secured to a carrier strut extending transversely over a vehicle roof.

Figure 1:
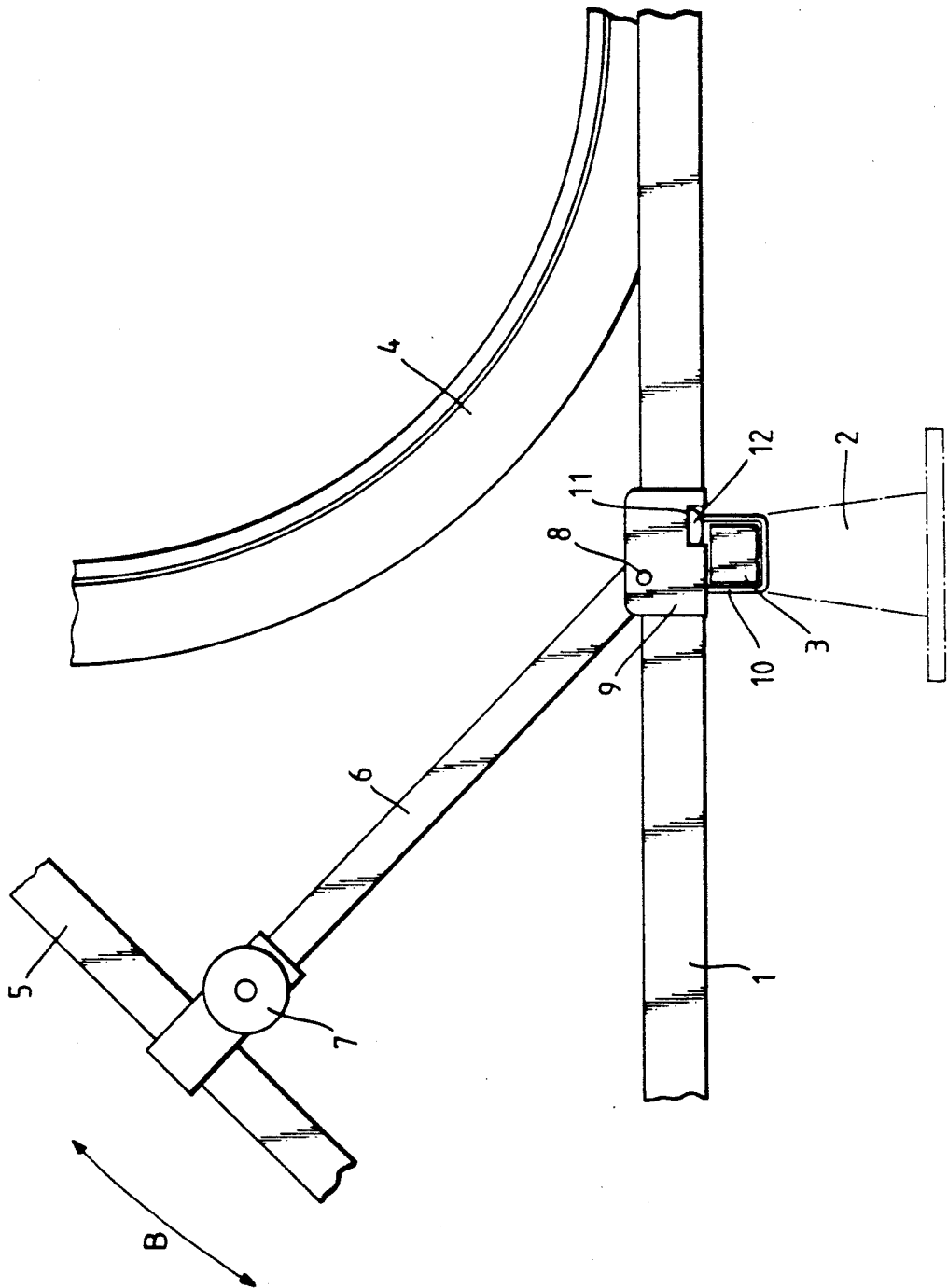
FIG. 1 is a fragmentary side elevation of the holder device in its operative position.

FIG. 1 shows a partial side elevation of a holder device which is designed as a bicycle holder. It will be apparent from the Drawing that the holder device includes an elongate rail 1 which serves the function of support portion for supporting that load which rests on the holder device. Reference numeral 2 refers to a foot by means of which a carrier strut 3 extending transversely across the vehicle roof is secured on the vehicle roof. Reference numeral 4 refers to a portion of a cycle wheel and thereby illustrates that load which rests on the rail 1. Furthermore, reference numeral 5 refers to a part of the frame tube of a bicycle. It will further be apparent from the Drawing that the holder device includes a stirrup 6 which serves the function of anchorage portion and which, by the intermediary of a locking member 7, engages with the frame tube 5 of the cycle and thereby positionally fixes the cycle in the position carried on the rail 1. The lower ends of both shanks of the stirrup 6 are, by the intermediary of joints, 8 pivotally connected (according to the arrow B) to upwardly angled end portions 9 on a mid-section by the intermediary of which the stirrup 6 is connected to the rail 1. It will also be apparent from FIG. 1 that the holder device is secured to the carrier strut 3 by means of U-shaped yokes 10 which enclose the carrier strut 3 between themselves and the underface of the mid-section. It is further apparent from this Figure that the upwardly angled portion 9 of the mid-section is provided with an aperture 11 through which a lower end portion 12 of the stirrup 6 is exposed in such a manner that, in the illustrated position, the aperture 11 is closed in the lateral direction by the end portion 12. This end portion serves as a detent portion and is movable between a detent position (the position illustrated in FIG. 1) and a non-detent position where it exposes the aperture 11, in that the stirrup 6 is pivoted counter-clockwise according to the arrow B. Thus, the detent 12 is designed as a downward extension past the joints 8 of both shanks of the stirrup 6.

Figure 2:
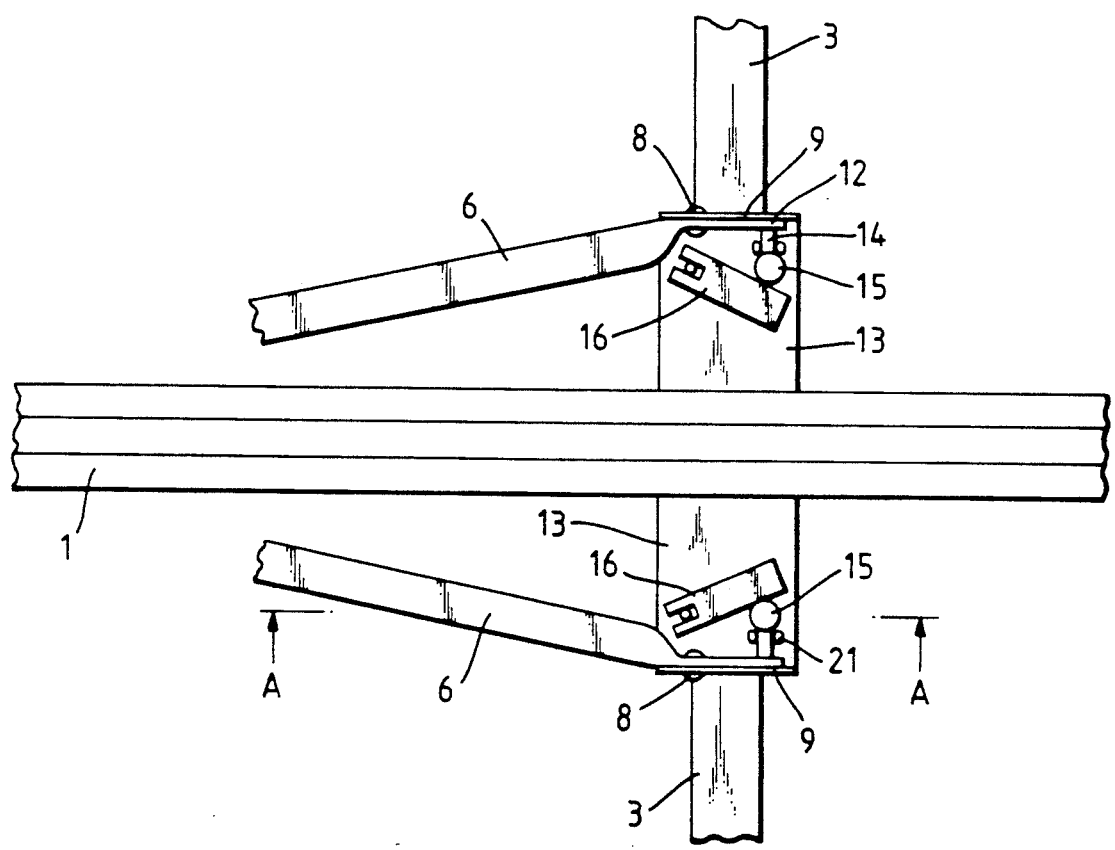
FIG. 2 is a top plan view of the holder device of FIG. 1.

It will be apparent from FIG. 2 that the apertures 11 provided in the upwardly angled end portions 9 of the mid-section 13 are in communication with a slot or groove-shaped opening 14 in the material of the mid-section 13. It will further be apparent that a first shank of the U-shaped yoke 10 is provided, on its free end, with a head 15 which is located on the upper face of the mid-section 13 and is of such size that it cannot pass down through the slot 14. It will also be apparent from this drawing figure that the other shank of the U-shaped yoke 10 extends through a closed opening 19 in the bottom surface of the mid-section 13, and that this second shank is connected to a locking handle 16 which is designed as an excenter lock.

Figure 3:
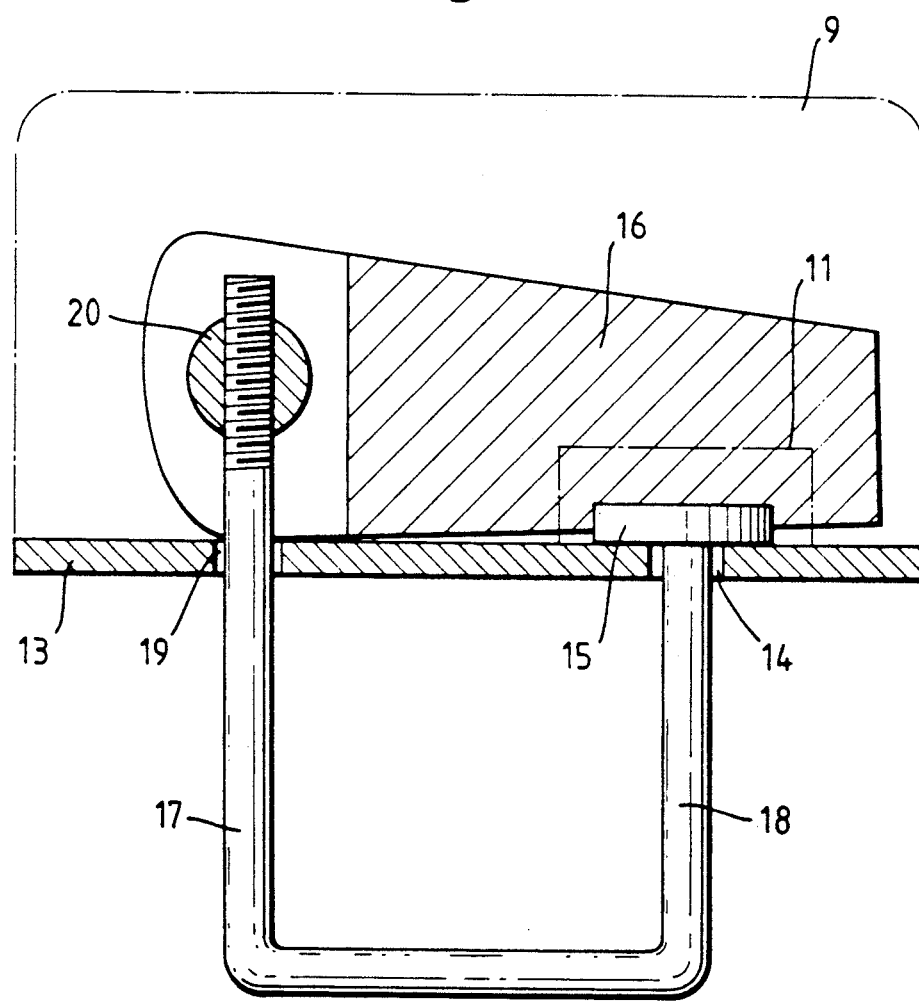
FIG. 3 is a partial cross-section taken along the section line A—A in FIG. 2.

FIG. 3 illustrates on a larger scale the construction of the U-shaped yoke 10 and its cooperation with the mid-section 13. It should here be observed that the second shank 17 of the U-shaped yoke 10 extends up through a closed opening 19—preferably circular in configuration—through the mid-section 13. It is further clearly apparent how the head 15 of the first shank 18 rests on the upper face of the mid-section 13. The figure also shows that the second shank 17 extends with a relatively long portion up over the mid-section 13 and that this portion is threaded and in engagement with a transverse bolt 20 in the locking handle 16. This figure also illustrates, by means of broken lines, the aperture 11 in the upwardly angled end portion 9 (also shown by broken lines) on the mid-section 13.

If the locking handle 16, which is shown in its locking position fixedly clamping the U-shaped yoke about the carrier strut 3, is pivoted through approx. 90° in a counter-clockwise direction, it becomes possible to lower the second shank 17 of the U-shaped yoke 10 so that the fixed clamping of the yoke about the carrier strut (not shown) is released. In this position, the head 15 on the first shank may be displaced laterally (towards the observer in FIG. 3), with the first shank passing in the slot-shaped opening 14. This displacement or shifting of the U-shaped yoke 10 may be effected so far that the head 15 passes but laterally through the aperture 11 (see FIG. 1), so that the first shank of the yoke becomes completely free. In this position, the yoke may be obliquely inclined so that it can be brought to a position wholly free from the carrier strut, whereafter the entire holder device may, naturally, be removed from the carrier strut.

The procedure for mounting the holder device is the reverse, i.e. the U-shaped yoke 10 is positioned about the carrier strut, whereafter its first shank 18 with the head 15 is passed in through the aperture 11 and in along the slot 14. Thereafter, the locking handle is pivoted through approx. 90° in a clockwise direction so that the second shank 17 is lifted and clamping is effected about the carrier strut 3.

When the stirrup 6 is subsequently raised to its operative position, its detent portion 12, i.e. its extension past the joint 8, will cover the aperture 11 so that the head 15 can no longer be removed from the slot 14. Hence, in this position the holder device is fixedly positioned on the carrier strut in such a manner that it cannot be removed by unauthorised persons. When the upper end of the stirrup 6 is subsequently locked by means of a cylinder lock in the load, nor can the stirrup 6 be pivoted by unauthorised persons in a clockwise direction (according to the arrow B in FIG. 1) from the operative position to that position where the detent portion 12 no longer covers the aperture 11.

According to the present invention, the second shank 17 is of such a length that, even if the locking handle 16 with the transverse bolt 20 were to be unscrewed from the shank, this cannot—because of its length and the placing of the opening 19—be released from the mid-section 13 as long as the head 15 is located above the slot 14. Release of the second shank 17 is, thus, only possible when also the first shank 18 is freely movable, i.e. is located outside the upwardly angled end portion 9. As an extra security precaution, the upper end portion of the shank 17 may, of course, be flared out or riveted on the upper side of the transverse bolt 20, so that removal of the locking handle 16 is greatly impeded or wholly prevented.

In order to improve the maneuverability of the holder device and prevent the U-shaped yoke 10 from inadvertantly assuming the incorrect position on handling of the holder device, there may be provided, on the upper face of the mid-section 13 on either side of the slot 14, upwardly directed projections or beads 21 which prevent unintentional lateral sliding or displacement of the head 15.

DESCRIPTION OF ALTERNATIVE EMBODIMENTS

It was mentioned by way of introduction that the present invention is not restricted to employment in the bicycle holder described in the foregoing for purposes of exemplification. Thus, the present invention may also be applied, for instance, to a ski holder of the type which is provided, on the upper side of the carrier strut 3, with a bottom rail extending therealong and on which the skis rest. In such a physical application, this rail is secured on the carrier strut by means of U-shaped yokes which correspond to the U-shaped yoke 10 according to the present invention and which may be pivotally secured in the bottom rail. Such a ski holder is provided, above the bottom rail, with a pivotal upper rail which is employed, in a lowered operative position, to fixedly clamp the skis between itself and the bottom rail. In this embodiment, the upper rail is provided, in the proximity of its joint connection with the bottom rail, with a clamping portion which prevents removal of the securement yoke when the upper rail is pivoted down to its locked position. Thus, in such an embodiment, the upper rail of the ski holder corresponds to the pivotal stirrup 6 in the cycle holder and, furthermore, the bottom rail in the ski holder corresponds to the mid-section 13 in the above-described cycle holder.

I claim:

1. A holder device for fixedly securing a load, preferably a cycle, on a carrier strut positioned over a vehicle roof, said holder comprising:

a support position for supporting the load, the support portion having a mid-section having opposite sides with at least one upwardly angled portion extending from one of the opposite sides of said mid-section; an anchorage portion disposed to engage with and positionally fix the load on the support portion, said anchorage portion being pivotally secured to said upwardly angled portion, wherein the mid-section of said support portion is adapted to be releasably secured to said carrier strut extending over the vehicle roof; and at least one locking member adapted to secure said mid-section to said carrier strut, said locking member having a locking portion wherein said angled portion has an aperture for receiving said locking portion of the locking member and the anchorage portion has a detent portion for closing the aperture when the anchorage portion is pivoted to a position engaging with the load whereby said locking member is prevented from being removed from said aperture.

2. The holder device as claimed in claim 1, characterized in that the locking member is in the form of a U-shaped yoke having first and second shanks, wherein said locking portion comprises a head on a free end of said first shank thereof and the second shank thereof is provided with a locking clamp adapted for fixedly tightening the yoke about the carrier strut.

3. The holder device as claimed in claim 2, characterized in that the second shank of the yoke, provided with the locking clamp extends through an opening in the mid-section said second shank having a length such that it is not withdrawable from the opening when the locking clamp is removed and the head of the first shank is in engagement with the mid-section.

4. The holder device as claimed in claim 3, characterized in that the first shank of the yoke is accommodated in a slot-shaped opening in the mid-section wherein the slot-shaped opening extends from the aperture in the upwardly angled portion.

* * * * *